(12) United States Patent
Huang

(10) Patent No.: US 9,684,178 B2
(45) Date of Patent: Jun. 20, 2017

(54) SOLID STATE ILLUMINATOR FOR EMITTING BEAMS WITH DIFFERENT WAVELENGTHS AND OPERATING METHOD USING THE SAME

(71) Applicant: DELTA ELECTRONICS, INC., Kuei San (TW)

(72) Inventor: June-Jei Huang, Kuei San (TW)

(73) Assignee: DELTA ELECTRONICS, INC. (TW)

( * ) Notice: Subject to any disclaimer, the term of this patent is extended or adjusted under 35 U.S.C. 154(b) by 193 days.

(21) Appl. No.: 14/493,914

(22) Filed: Sep. 23, 2014

(65) Prior Publication Data

US 2016/0054574 A1 Feb. 25, 2016

(30) Foreign Application Priority Data

Aug. 19, 2014 (TW) .............................. 103128376 A

(51) Int. Cl.
*G02F 1/1335* (2006.01)
*G02F 1/133* (2006.01)
(Continued)

(52) U.S. Cl.
CPC ....... *G02B 27/2242* (2013.01); *G02B 5/3083* (2013.01); *G02B 27/2235* (2013.01); *G02B 27/283* (2013.01); *G03B 21/204* (2013.01); *H04N 9/3158* (2013.01); *H04N 9/3167* (2013.01); *H04N 13/0431* (2013.01);
(Continued)

(58) Field of Classification Search
CPC .. G02B 27/0172; G02B 6/00; G02B 27/0101; G02B 27/28; G02B 6/2766; G02B 27/283; G02B 27/286; G02B 27/2235; G02B 27/2242; G02B 5/3083; G02F 1/0136; G03B 21/204; G03B 21/2066;
(Continued)

(56) References Cited

U.S. PATENT DOCUMENTS 8,201,945 B2 6/2012 Ellinger et al.
8,469,519 B2 6/2013 Marcus et al.
(Continued)

FOREIGN PATENT DOCUMENTS

CN 103018864 4/2013
TW 201224632 6/2012
(Continued)

*Primary Examiner* — Huyen Ngo
(74) *Attorney, Agent, or Firm* — Hauptman Ham, LLP

(57) ABSTRACT

A solid state illuminator for generating time sequential 6-primary color includes a first light source, a second light source, a path choosing module, a multi-band filter, a first photoluminescence module, a second photoluminescence module, a first optical module, and a second optical module. The first light source and the second light source provide a first beam with a first wavelength and a second beam with a second wavelength respectively, and the first wavelength is not overlapped with the second wavelength. The first optical module enables the first beam to enter the first photoluminescence module and guide the beam to pass through the multi-band filter to arrive at a predetermined position. The second optical module enables the second beam to enter the second photoluminescence module and guide the beam to be reflected by the multi-band filter to arrive at the predetermined position.

20 Claims, 13 Drawing Sheets

(51) Int. Cl.
*G02B 27/22* (2006.01)
*G02B 27/28* (2006.01)
*G02B 5/30* (2006.01)
*H04N 13/04* (2006.01)
*G03B 21/20* (2006.01)
*H04N 9/31* (2006.01)
*G03B 33/08* (2006.01)
*G03B 35/16* (2006.01)

(52) U.S. Cl.
CPC ..... *H04N 13/0459* (2013.01); *G03B 21/2066* (2013.01); *G03B 33/08* (2013.01); *G03B 35/16* (2013.01)

(58) Field of Classification Search
CPC .... G03B 33/08; G03B 35/16; H04N 13/0459; H04N 9/3167
USPC .................................. 362/231, 235; 349/15
See application file for complete search history.

(56) References Cited

U.S. PATENT DOCUMENTS

| | | | |
|---|---|---|---|
| 9,025,253 B2* | 5/2015 | Hadad | G02B 6/00 353/81 |
| 2007/0127121 A1 | 6/2007 | Maximus et al. | |
| 2009/0213330 A1* | 8/2009 | Silverstein | H04N 13/0438 353/8 |
| 2010/0208342 A1 | 8/2010 | Olsen | |
| 2011/0181840 A1 | 7/2011 | Cobb | |
| 2014/0119003 A1* | 5/2014 | Huang | H04N 9/3114 362/231 |
| 2015/0167932 A1 | 6/2015 | Yamada et al. | |

FOREIGN PATENT DOCUMENTS

| | | |
|---|---|---|
| TW | I425319 | 2/2014 |
| TW | 201423158 | 6/2014 |

* cited by examiner

SOLID STATE ILLUMINATOR FOR EMITTING BEAMS WITH DIFFERENT WAVELENGTHS AND OPERATING METHOD USING THE SAME

RELATED APPLICATIONS

This application claims priority to Taiwan Application Serial Number 103128376, filed Aug. 19, 2014, which is herein incorporated by reference.

BACKGROUND

Field of Invention

The present invention relates to a solid state illuminator.

Description of Related Art

By exploiting the binocular parallax of humans, a stereoscopic display device provides two slightly different images to respective left and right eyes of an observer, so as to generate a stereoscopic image. According to the various ways for providing the different images, the general stereoscopic display technologies include a polarization 3D technology, an anaglyphic 3D technology, and a wavelength multiplexing 3D technology.

The stereoscopic display device with the wavelength multiplexing technology generates a stereoscopic image by providing images with different wavelength ranges to observers. The general color display device produces various colors in the color space by mixing the additive primary colors, i.e. red (R), green (G), and blue (B). Therefore, the stereoscopic display device with the wavelength multiplexing technology can separately produce left-eye images with a set of primary colors R1, G1, and B1, and right-eye images with the other set of primary colors R2, G2, and B2.

The conventional stereoscopic display device with the wavelength multiplexing technology produces two sets of three primary colors by using two light sources, which are often lasers. However, the lasers have poor efficiency at the range of green rays, and the prices of the lasers are high so as to significantly increase the cost of the light sources.

SUMMARY

The invention provides a solid state illuminator for a stereoscopic display. By the configuration of light sources, photoluminescence elements, filters, and exploiting liquid crystal element to control paths of beams, the solid state illuminator can optionally provides a red, green, or blue beam, and can provides two different sets of red, green, and blue beams sequentially.

One aspect of the present invention provides a solid state illuminator, includes a first light source, a second light source, a path choosing module, a multi-band filter, a first photoluminescence module, a second photoluminescence module, a first optical module, and a second optical module. The first light source and the second light source provide a first beam with a first wavelength and a second beam with a second wavelength respectively, and the first wavelength is not overlapped with the second wavelength. The path choosing module is used for controlling directions of the first beam and the second beam. The second beam transmits through the multi-band filter, and the first beam is reflected by the multi-band filter. The first photoluminescence module for providing a third beam or a fourth beam, and the second photoluminescence module for providing a fifth beam or a sixth beam. The first optical module receives the first beam or the second beam from the path choosing module, enables the first beam to enter the first photoluminescence module and to be transformed into the third beam or the fourth beam, and guides the second beam, the third beam or the fourth beam to pass through the multi-band filter to arrive at a predetermined position. The second optical module receives the first beam or the second beam from the path choosing module, enables the second beam to enter the second photoluminescence module and to be transformed into the fifth beam or the sixth beam, and guides the first beam, the fifth beam or the sixth beam to be reflected by the multi-band filter to arrive at the predetermined position.

In one or more embodiments, the path choosing module includes two liquid crystal optical modulators and a polarizing beam splitter, the liquid crystal optical modulators are disposed corresponding to the first light source and the second light source respectively, the polarizing beam splitter is disposed on a plurality of paths of the first beam and the second beam, so that the first beam and the second beam pass through the liquid crystal optical modulators respectively and then both enter the polarizing beam splitter, and the directions of the first beam and the second beam are chosen at the polarizing beam splitter.

In one or more embodiments, the first photoluminescence module includes a third photoluminescence element and a fourth photoluminescence element, the first beam optionally enters the third photoluminescence element or the fourth photoluminescence element and is transformed into the third beam with a third wavelength or the fourth beam with a fourth wavelength, the second photoluminescence module includes a fifth photoluminescence element and a sixth photoluminescence element, and the second beam optionally enters the fifth photoluminescence element or the sixth photoluminescence element and is transformed into the fifth beam with a fifth wavelength or the sixth beam with a sixth wavelength.

In one or more embodiments, the first optical module is disposed on one side of the polarizing beam splitter opposed to the first light source, the first optical module includes a first liquid crystal modulator and a first polarizing beam splitter, the second optical module is disposed on one side of the polarizing beam splitter opposed to the second light source, and the second optical module includes a second liquid crystal modulator and a second polarizing beam splitter.

In one or more embodiments, the first optical module includes a first dichroic mirror, disposed on one side of the first polarizing beam splitter adjacent to the fourth photoluminescence element for reflecting the fourth beam to the multi-band filter and letting the third beam pass through the first dichroic mirror to enter the multi-band filter, and the second optical module includes a second dichroic mirror, disposed on one side of the second polarizing beam splitter adjacent to the sixth photoluminescence element for reflecting the sixth beam to the multi-band filter and letting the fifth beam pass through the second dichroic mirror to enter the multi-band filter.

In one or more embodiments, the first beam and the third beam transmit through the first dichroic mirror, the fourth beam is reflected by the first dichroic mirror, the second beam and the fifth beam transmit through the second dichroic mirror, and the sixth beam is reflected by the second dichroic mirror.

In one or more embodiments, the first optical module includes a first filter and a quarter-wave plate, both disposed corresponding to the fourth photoluminescence element, for reflecting the second beam to the first dichroic mirror, and the second optical module includes a second filter and another quarter-wave plate, both disposed corresponding to the sixth photoluminescence element, for reflecting the first beam to the second dichroic mirror.

In one or more embodiments, the first filter reflects the second beam, the first beam, the third beam, and the fourth beam transmit through the first filter, the second filter reflects the first beam, and the second beam, the fifth beam, and the sixth beam transmit through the second filter.

In one or more embodiments, the third wavelength and the fifth wavelength have the same spectrum, the fourth wavelength and the sixth wavelength have the same spectrum, the second beam, a part of the third beam, and a part of the fourth beam transmit through the multi-band filter, and the first beam, another part of the third beam, and another part of the fourth beam are reflected by the multi-band filter.

In one or more embodiments, the second beam, the third beam, and the fourth beam transmit through the multi-band filter, and the first beam, the fifth beam, and the sixth beam are reflected by the multi-band filter.

In one or more embodiments, the transmittances of the first polarizing beam splitter and the second polarizing beam splitter of the light of different polarization states are different in the ranges of the first wavelength and the second wavelength, and are the same in the ranges of the third wavelength, the fourth wavelength, the fifth wavelength, and the sixth wavelength.

In one or more embodiments, the peaks of the third wavelength and the fifth wavelength are in the range of 610 nanometers to 670 nanometers, and the peaks of the fourth wavelength and the sixth wavelength are in the range of 510 nanometers to 580 nanometers.

In one or more embodiments, the first optical module and the second optical module include at least one collective lens respectively, and the collective lenses are disposed between the first polarizing beam splitter and the third photoluminescence element or the fourth photoluminescence element, and between the second polarizing beam splitter and the fifth photoluminescence element or the sixth photoluminescence element.

In one or more embodiments, the solid state illuminator includes a light source controller for switching the first beam and the second beam.

In one or more embodiments, the solid state illuminator includes a liquid crystal controller for switching the liquid crystal optical modulators, the first liquid crystal modulator, and the second liquid crystal modulator.

In one or more embodiments, the first beam and the second beam are blue rays, the peak of the first wavelength is in the range of 435 nanometers to 450 nanometers, and the peak of the second wavelength is in the range of 455 nanometers to 470 nanometers.

Another aspect of the present invention is a operating method of a solid state illuminator, including: providing a solid state illuminator of claim 1; turning on the first light source and the second light source sequentially; controlling the path choosing module sequentially to choose the directions of the first beam or the second beam, so that the first beam or the second beam enters the first optical module or the second optical module; and controlling the first optical module and the second optical module sequentially to choose the directions of the first beam or the second beam, so that the first beam passing through the first optical module enters the first photoluminescence module, and that the second beam passing through the second optical module enters the second photoluminescence module.

In one or more embodiments, the operating method includes turning on the first light source, turning off the second light source, turning on a liquid crystal optical modulator of the path choosing module, and turning off a second liquid crystal modulator of the second optical module at a first timing, so that the first beam passing through the second optical module does not enter the second photoluminescence module and is reflected to output the first beam; and turning on the first light source, turning off the second light source, turning off the liquid crystal optical modulator, and turning off a first liquid crystal modulator of the first optical module at a second timing, so that the first beam enters a third photoluminescence element of the first photoluminescence module to output a third beam with a third wavelength.

In one or more embodiments, the operating method includes turning on the first light source, turning off the second light source, turning off the liquid crystal optical modulator, and turning on the first liquid crystal modulator at a third timing, so that the first beam enters a fourth photoluminescence element of the first photoluminescence module to output a fourth beam with a fourth wavelength, wherein the peaks of the first wavelength, the third wavelength, the fourth wavelength are not overlapped; and turning on the second light source, turning off the first light source, turning on the other liquid crystal optical modulator of the path choosing module, and turning off the first liquid crystal modulator at a fourth timing, so that the second beam passing through the first optical module does not enter the first photoluminescence module and is reflected to output the second beam.

In one or more embodiments, the operating method includes turning on the second light source, turning off the first light source, turning off the other liquid crystal optical modulator, and turning off the second liquid crystal modulator at a fifth timing, so that the second beam enters a fifth photoluminescence element of the second photoluminescence module to output a fifth beam with a fifth wavelength; and turning on the second light source, turning off the first light source, turning off the other liquid crystal optical modulator, and turning on the second liquid crystal modulator at a sixth timing, so that the second beam enters a sixth photoluminescence element of the second photoluminescence module to output a sixth beam with a sixth wavelength, wherein peaks of the second wavelength, the fifth wavelength, the sixth wavelength are not overlapped.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
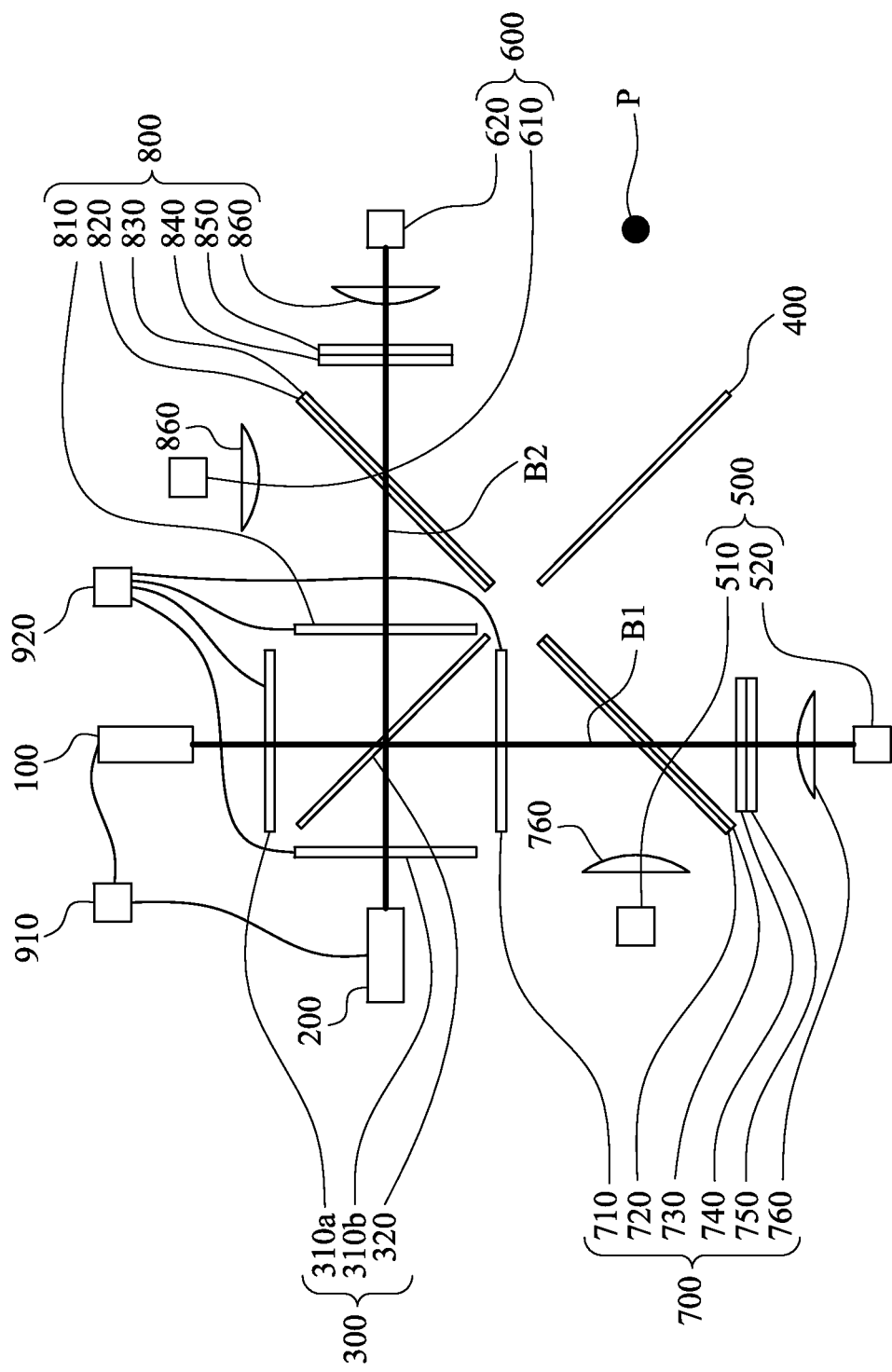
FIG. 1 is a schematic diagram for a solid state illuminator according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram for a solid state illuminator according to an embodiment of the present invention. One aspect of the present invention provides a solid state illuminator, includes a first light source 100, a second light source 200, a path choosing module 300, a multi-band filter 400, a first photoluminescence module 500, a second photoluminescence module 600, a first optical module 700, and a second optical module 800.

The first light source 100 and the second light source 200 provide a first beam B1 with a first wavelength and a second beam B2 with a second wavelength respectively, in which the ranges of the first wavelength and the second wavelength are not overlapped. Herein, the words "not overlapped" means that the spectrum of the first wavelength having a light intensity higher than 10% of the maximum intensity of the first wavelength is different from and not overlapped with the spectrum of the second wavelength having a light intensity higher than 10% of the maximum intensity of the second wavelength.

The path choosing module 300 is used for controlling directions of the first beam B1 and the second beam B2, so that the first beam B1 and the second beam B2 can optionally enter the first optical module 700 or the second optical module 800.

The first optical module 700 is used for enabling the first beam B1 to enter the first photoluminescence module 500, and preventing the second beam B2 from entering the first photoluminescence module 500. The first photoluminescence module 500 is disposed around the first optical module 700. The first photoluminescence module 500 includes a third photoluminescence element 510 and a fourth photoluminescence element 520, and the third photoluminescence element 510 and the fourth photoluminescence element 520 are used to receives the first beam B1 and transform the first beam B1 into a third beam (not shown) or a fourth beam (not shown).

The third photoluminescence element 510 and the fourth photoluminescence element 520 can be elements with a fluorescent coating, in which a reflecting layer can be disposed under the fluorescent coating for reflecting the third beam or the fourth beam back to the first optical module 700. Then, the first optical module 700 guides the second beam B2, the third beam, or the fourth beam to pass through the multi-band filter 400, and to arrive at a preserved location P.

Similarly, the second optical module 800 is used for enabling the second beam B2 to enter the second photoluminescence module 600, and preventing the first beam B1 from entering the second photoluminescence module 600. The second photoluminescence module 600 is disposed around the second optical module 800. The second photoluminescence module 600 includes a fifth photoluminescence element 610 and a sixth photoluminescence element 620, and the fifth photoluminescence element 610 and the sixth photoluminescence element 620 are used to receives the second beam B2 and transform the second beam B2 into a fifth beam (not shown) or a sixth beam (not shown).

The fifth photoluminescence element 610 and the sixth photoluminescence element 620 can be elements with a fluorescent coating, in which a reflecting layer can be disposed under the fluorescent coating for reflecting the fifth beam or the sixth beam back to the second optical module 800. Then, the second optical module 800 guides the first beam B1, the fifth beam, or the sixth beam to be reflected by the multi-band filter 400, and to arrive at a preserved location P.

In this embodiment, the second beam B2, the third beam, and the fourth beam transmit through the multi-band filter, and the first beam B1, the fifth beam, and the sixth beam are reflected by the multi-band filter.

In this embodiment, the peak of the first wavelength is in the range of 435 nanometers to 450 nanometers, and the peak of the second wavelength is in the range of 455 nanometers to 470 nanometers. The third beam and the fifth beam are designed to be red rays, the peaks of which are approximately in the range of 610 nanometers to 670 nanometers. The fourth beam and the sixth beam are designed to be green rays, the peaks of which are approximately in the range of 510 nanometers to 580 nanometers.

In one or more embodiments, the first beam B1 and the second beam B2 are linearly polarized. Ideally, the first light source 100 and the second light source 200 are blue lasers with different peak wavelengths, and can emit linearly polarized blue light. Also, for ensuring the polarization properties, plural polarizers can be disposed in front of the first light source 100 and the second light source 200.

In this embodiment, by the polarization properties of the first beam B1 and the second beam B2, the path choosing module 300, the first optical module 700, and the second optical module 800 are configured for providing beams with different wavelength ranges. The followings are illustration of the configuration of various elements and modules.

The path choosing module 300 includes two liquid crystal optical modulators 310a, 310b and a polarizing beam splitter 320. The liquid crystal optical modulators 310a, 310b are disposed corresponding to the first light source 100 and the second light source 200 respectively, and the polarizing beam splitter 320 is disposed on the paths of the first beam B1 and the second beam B2, so that after the first beam B1 and the second beam B2 transmit through the liquid crystal optical modulators 310a, 310b, the first beam B1 and the second beam B2 both enter the polarizing beam splitter 320. The directions of the first beam B1 and the second beam B2 are chosen at the polarizing beam splitter 320.

To be specific, the liquid crystal optical modulators 310a, and 310b can be twisted-nematic liquid crystal cells. The alignment direction of one side of the cells facing the first light source 100 or the second light source 200 is parallel to the polarization direction of the first beam B1 or the second beam B2. The alignment direction of the other side of the cells away from the first light source 100 or the second light source 200 is vertical to the polarization direction of the first beam B1 or the second beam B2. Therefore, by switch the liquid crystal optical modulators 310a, 310b, the polarization state of the first beam B1 or the second beam B2 passing through the liquid crystal optical modulators 310a, 310b can maintain as the original state or change to be a new polarization state orthogonal to the original state.

On the other hand, the polarizing beam splitter 320 has the properties that s-polarized light (vertically polarized) is reflected by the polarizing beam splitter 320 and the p-polarized light (horizontally polarized) can transmit through the polarizing beam splitter 320. As a result, by the liquid crystal optical modulators 310a, and 310b controlling the polarization states, the first beam B1 or the second beam B2 can be controlled to be reflected by or pass through the polarizing beam splitter 320, and then the directions of the first beam B1 or the second beam B2 can be decided.

In one embodiment, the first optical module 700 is disposed on one side of the polarizing beam splitter 320 opposed to the first light source 100. The first optical module 700 is used for receiving the first beam B1 or the second beam B2 from the path choosing module 300. The purpose is to make the first beam B1 enter the first photoluminescence module 500, to prevent the second beam B2 from entering the first photoluminescence module 500, and to guide the first beam B1 or the second beam B2 to the multi-band filter 400.

The first optical module 700 includes a first liquid crystal modulator 710, a first polarizing beam splitter 720, a first dichroic mirror 730, a quarter-wave plate 740, and a first filter 750. As the liquid crystal optical modulators 310a and 310b in previous description, the first liquid crystal modulator 710 has similar configuration. By switching the first liquid crystal modulator 710, the polarization state of the first beam B1 or the second beam B2 passing through the first liquid crystal modulator 710 can maintain as the original state or change to be a new polarization state orthogonal to the original state.

On the other hand, the first polarizing beam splitter 720 has similar configuration with the polarizing beam splitter 320 stated above. The difference is that the first polarizing beam splitter make the vertically polarized light be reflected and the horizontally polarized light transmit through it, only in the wavelength range of blue light. The wavelength range of blue light includes the first wavelength and the second wavelength. The polarizing beam splitter 320 stated above has the similar property, which is that vertically polarized light is reflected and the horizontally polarized light can transmit through it, but the property do not limited only in the wavelength range of blue light.

Figure 2:
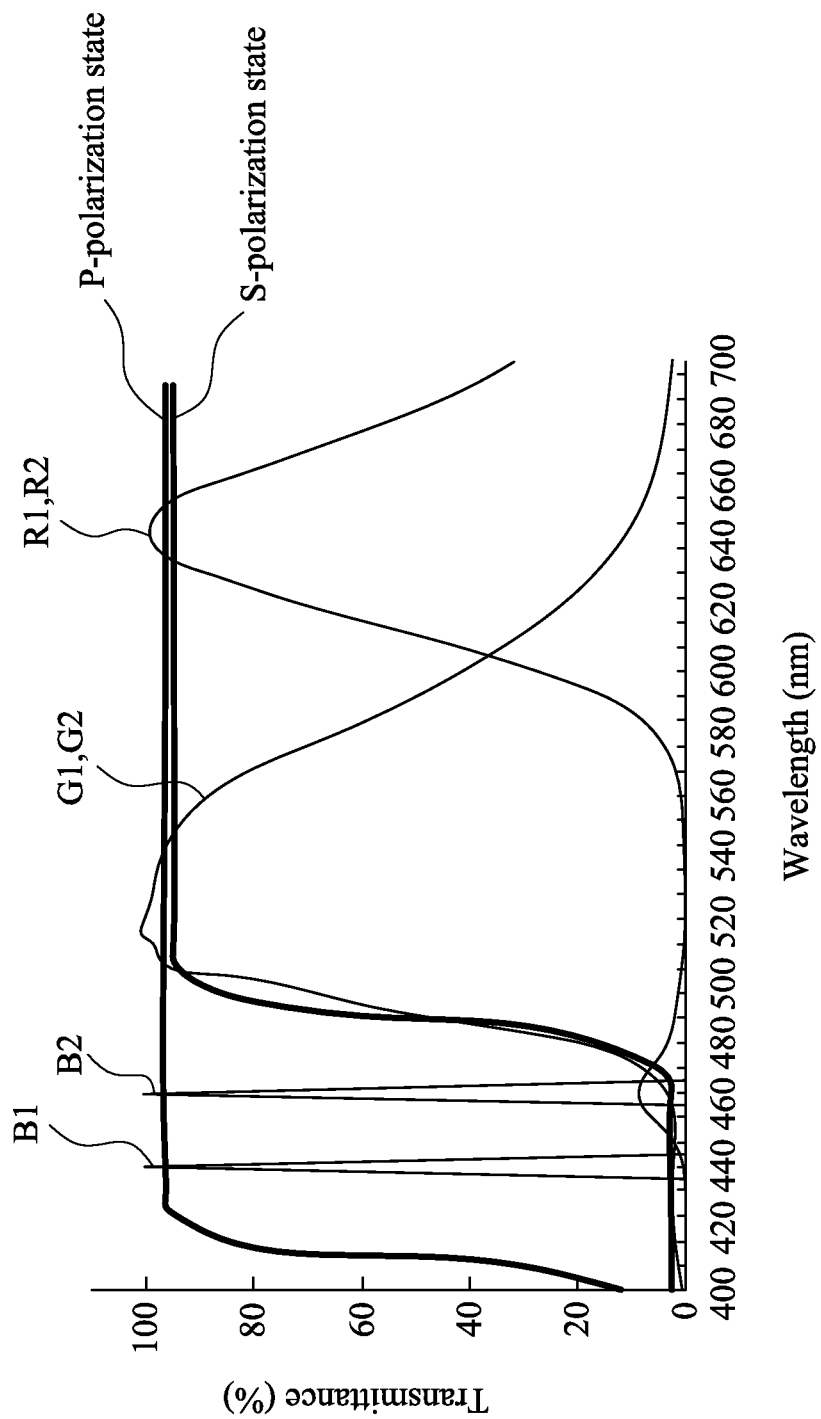
FIG. 2 is a transmittance spectrum of a first polarizing beam splitter and a second polarizing beam splitter shown in FIG. 1.

FIG. 2 is a transmittance spectrum of a first polarizing beam splitter 720 and a second polarizing beam splitter 820 shown in FIG. 1. In the wavelength range of blue light, two beams with polarization states orthogonal to each other have different transmittances. For example, as shown the figure, in the wavelength range of 435-470 nanometers, the transmittance of p-polarized light (horizontally polarized) is approximately 100%, and the transmittance of s-polarized light (vertically polarized) is approximately 0%. In the wavelength range outside the blue light, two beams with polarization states orthogonal to each other have the same and high transmittance. For example, as shown the figure, in the wavelength range of 510-670 nanometers, the transmittances of p-polarized light and s-polarized light are both approximately 100%.

As a result, by the first liquid crystal modulator 710 controlling the polarization states, the first beam B1 or the second beam B2 can be controlled to be reflected by or pass through the first polarizing beam splitter 720, and then the directions of the first beam B1 or the second beam B2 can be decided.

Figure 3:
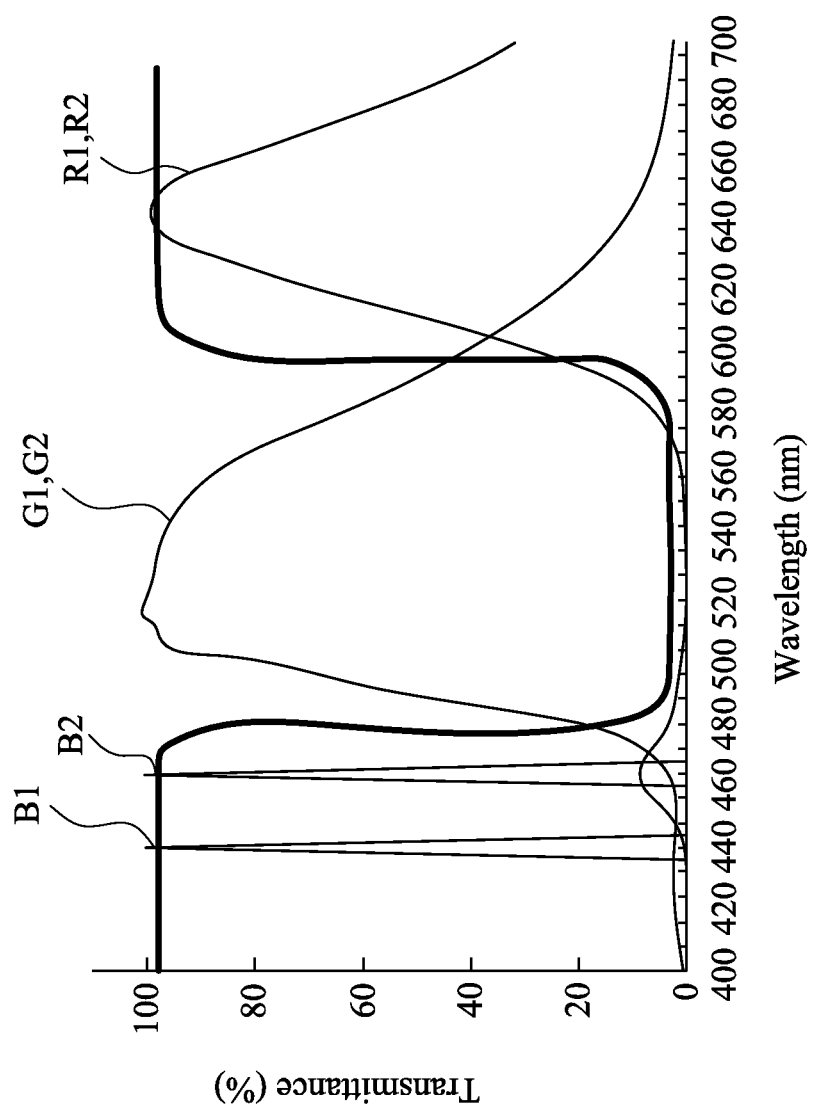
FIG. 3 is a transmittance spectrum of a first dichroic mirror and a second dichroic mirror shown in FIG. 1.

The first dichroic mirror 730 of the first optical module 700 is disposed on one side of the first polarizing beam splitter 720 adjacent to the fourth photoluminescence element 520. FIG. 3 is a transmittance spectrum of a first dichroic mirror 730 and a second dichroic mirror 830 shown in FIG. 1. The transmittance of the first dichroic mirror 730 is approximately 0% in the wavelength range of 480-600 nanometers, in which the wavelength range includes the fourth wavelength, and therefore the first dichroic mirror 730 can reflect the fourth beam G1. The transmittance of the first dichroic mirror 730 is approximately 100% in the wavelength range outside 480-600 nanometers, in which the wavelength range includes the first wavelength and the third wavelength, and therefore the first beam B1 and the third beam R1 can transmit through the first dichroic mirror 730. The first dichroic mirror 730 is used for reflecting the fourth beam G1 to the multi-band filter 400, and letting the third beam R1 passing through itself enter the multi-band filter 400.

Figure 4A:
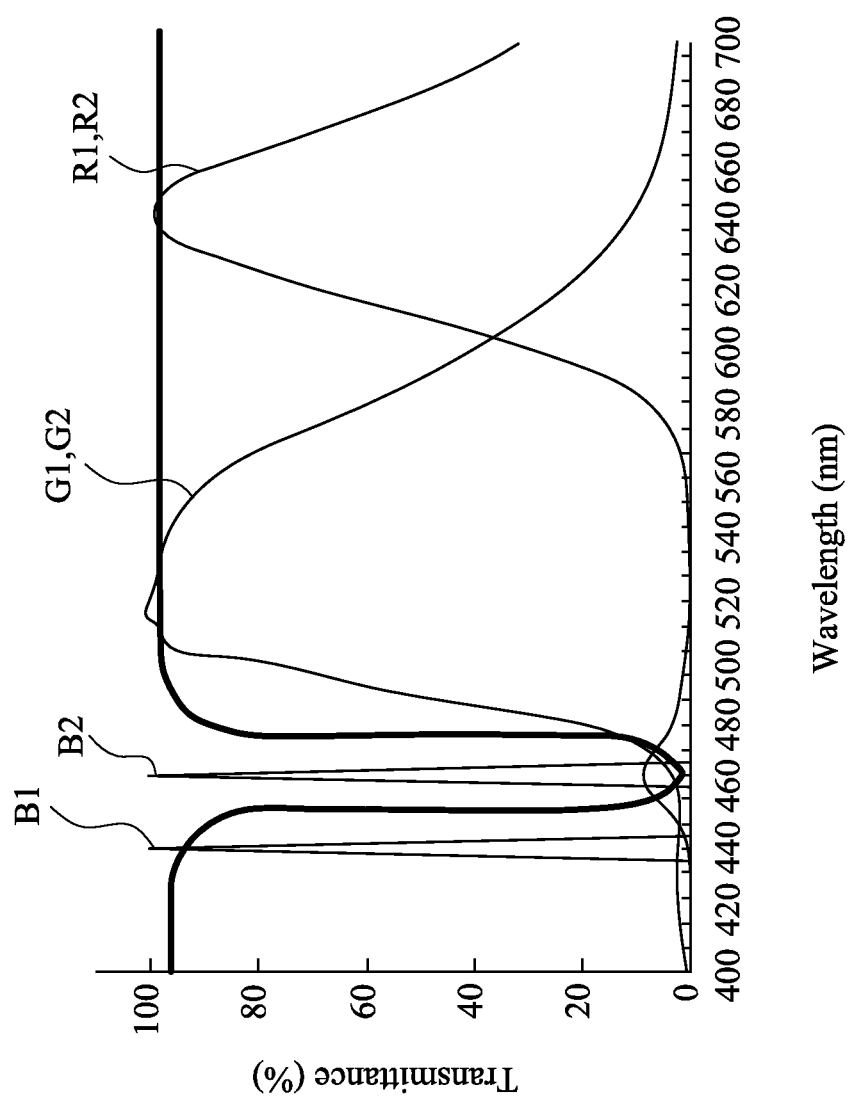
FIG. 4A is a transmittance spectrum of a first filter shown in FIG. 1.

The first filter 750 of the first optical module 700 is disposed corresponding to the fourth photoluminescence element 520. FIG. 4A is a transmittance spectrum of the first filter 750 shown in FIG. 1. The first beam B1, the third beam R1, and the fourth beam G1 transmit through the first filter 750. The first filter 750 reflects the second beam B2 to the first dichroic mirror 730. In addition, the quarter-wave plate 740 is disposed on one side of the first filter 750 facing the first polarizing beam splitter 720, for changing the polarization states of the beams.

In one or more embodiments, the first optical module 700 includes at least one collective lens 760. The collective lenses 760 are disposed between the first polarizing beam splitter 720 and the third photoluminescence element 510 or the fourth photoluminescence element 520, for collecting the third beam R1 or the fourth beam G1.

Therefore, when the first beam B1 is controlled by the first liquid crystal modulator 710 to be s-polarized (vertically polarized), the first beam B1 is reflected by the first polarizing beam splitter 720 to the third photoluminescence element 510 and be transformed into the third beam R1. Then, the third beam R1 is reflected and collected to the first polarizing beam splitter 720. Since the transmittances of the first polarizing beam splitter 720 and the first dichroic mirror 730 are both about 100% in the third wavelength, the third beam R1 can transmit through the first polarizing beam splitter 720 and the first dichroic mirror 730 to the multi-band filter 400.

On the other hand, when the first beam B1 is controlled by the first liquid crystal modulator 710 to be p-polarized (horizontally polarized), the first beam B1 transmits through the first polarizing beam splitter 720 to the first dichroic mirror 730. Since the transmittances of the first dichroic mirror 730 and first filter 750 are both about 100% in the first wavelength, the first beam B1 can transmit through the first dichroic mirror 730 and the first filter 750 to the fourth photoluminescence element 520. The fourth photoluminescence element 520 receives the first beam B1 and outputs the fourth beam G1. Since the transmittance of the first filter 750 is about 100% in the fourth wavelength, and the transmittance of the first dichroic mirror 730 is about 0% in the fourth wavelength, after the reflection at the fourth photoluminescence element 520, the fourth beam G1 can transmit through the first filter 750 and be reflected by the first dichroic mirror 730 to the multi-band filter 400.

In another case, when the second beam B2 enters the first optical module 700, the second beam B2 is controlled not to enter the first photoluminescence module 500. The second beam B2 is controlled to be p-polarized (horizontally polarized) to pass through the first polarizing beam splitter 720. Since the transmittance of the first dichroic mirror 730 is about 100% in the second wavelength, and the transmittance of the first filter 750 is about 0% in the second wavelength, the second beam B2 transmits through the first dichotic mirror 730 and the quarter-wave plate 740 to the first filter 750, and then is reflected by the first filter 750 to transmit through the quarter-wave plate 740 and the first dichroic mirror 730 again. In this path, the reflected second beam B2 passes through the quarter-wave plate 740 twice, and therefore the original p-polarization state (horizontal polarization state) of the second beam B2 is changed to s-polarization state (vertical polarization state). As a result, the reflected second beam B2 can be reflected at the first polarizing beam splitter 720 to the multi-band filter 400.

Similarly, the second optical module 800 and the second photoluminescence module 600 have similar configurations with the first optical module 700 and the first photoluminescence module 500. For clear illustration, the configurations of the second optical module 800 and the second photoluminescence module 600 are illustrated below, and the similar details are not repeated herein.

In one or more embodiments, the second optical module 800 is disposed on one side of the polarizing bean splitter 320 opposed to the second light source 200. The second optical module 800 is used for receiving the first beam B1 or the second beam B2 from the path choosing module 300. The purpose is to make the second beam B2 enter the second photoluminescence module 600, to prevent the first beam B1 from entering the second photoluminescence module 600, and to guide the first beam B1 or the second beam B2 to the multi-band filter 400.

Similarly, the second optical module 800 includes a second liquid crystal modulator 810, a second polarizing beam splitter 820, a second dichroic mirror 830, a quarter-wave plate 840, and a second filter 850.

As the first liquid crystal modulator 710 and the first polarizing beam splitter 720 in previous description, the second liquid crystal modulator 810 and the second polarizing beam splitter 820 has similar configuration. The properties of the second polarizing beam splitter 820 are shown FIG. 2. As a result, by the second liquid crystal modulator 810 controlling the polarization states, the first beam B1 or the second beam B2 can be controlled to be reflected by or pass through the second polarizing beam splitter 820, and then the directions of the first beam B1 or the second beam B2 can be decided.

The second dichroic mirror 830 of the second optical module 800 is disposed on one side of the second polarizing beam splitter 820 adjacent to the sixth photoluminescence element 620. Referring back to FIG. 3, the transmittance of the second dichroic mirror 830 is approximately 0% in the wavelength range of 480-600 nanometers, in which the wavelength range includes the sixth wavelength, and therefore the second dichroic mirror 830 can reflect the sixth beam G2. The transmittance of the second dichroic mirror 830 is approximately 100% in the wavelength range outside 480-600 nanometers, in which the wavelength range includes the second wavelength and the fifth wavelength, and therefore the second beam B2 and the fifth beam R2 can transmit through the second dichroic mirror 830. The second dichroic mirror 830 is used for reflecting the sixth beam G2 to the multi-band filter 400, and letting the fifth beam R2 passing through itself enter the multi-band filter 400.

Figure 4B:
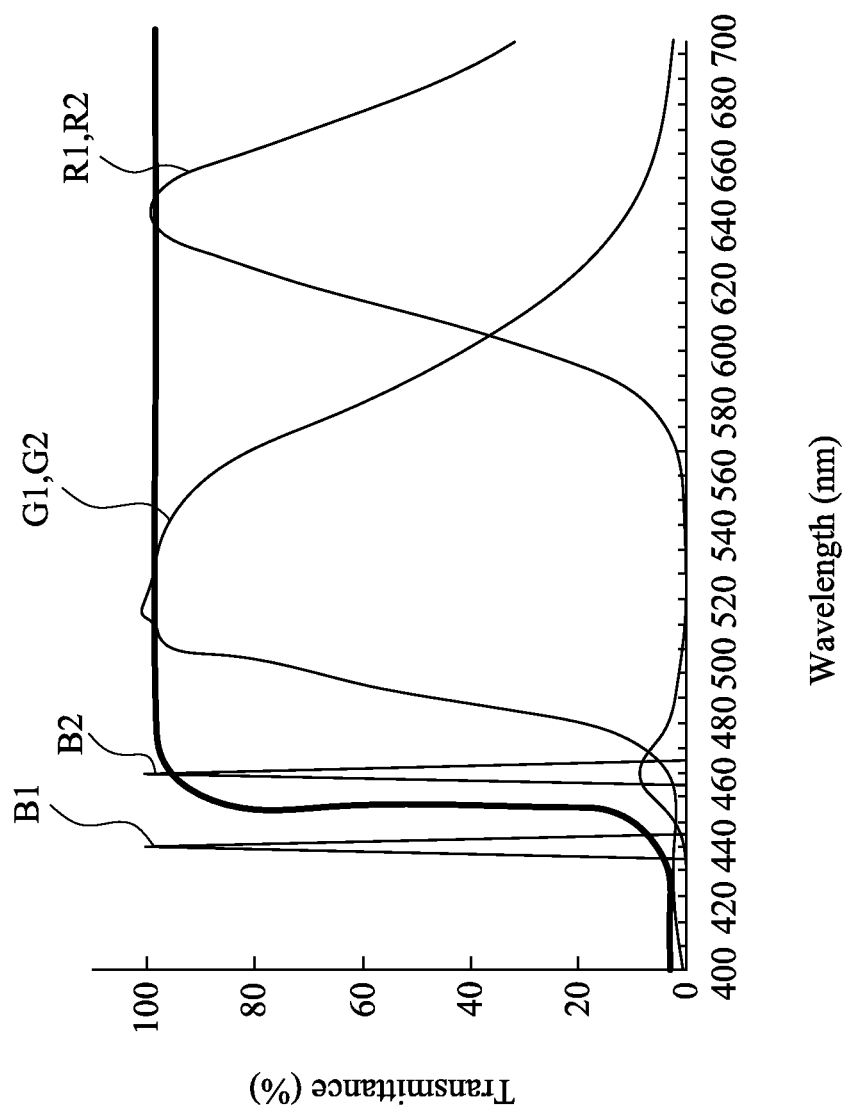
FIG. 4B is a transmittance spectrum of a second filter shown in FIG. 1.

The second filter 850 of the second optical module 800 is disposed corresponding to the sixth photoluminescence element 620, for reflecting the first beam B1 to the second dichroic mirror 830. FIG. 4B is a transmittance spectrum of the second filter 850 shown in FIG. 1. The second beam B2, the fifth beam R2, and the sixth beam G2 transmit through the second filter 850. The second filter 850 reflects the first beam B1. In addition, the quarter-wave plate 840 of the second optical module 800 is disposed on one side of the second filter 850 facing the second polarizing beam splitter 820, for change the polarization states of the beams.

In one or more embodiments, the second optical module 800 includes at least one collective lens 860. The collective lenses 860 are disposed between the second polarizing beam splitter 820 and the fifth photoluminescence element 610 or the sixth photoluminescence element 620, for collecting the fifth beam R2 or the sixth beam G2.

Therefore, when the second beam B2 is controlled by the second liquid crystal modulator 810 to be s-polarized (vertically polarized), the second beam B2 is reflected by the second polarizing beam splitter 820 to the fifth photoluminescence element 610 and be transformed into the fifth beam R2. Then, the fifth beam R2 is reflected and collected to the second polarizing beam splitter 820. Since the transmittances of the second polarizing beam splitter 820 and the second dichroic mirror 830 are both about 100% in the fifth wavelength (referring to FIG. 2 and FIG. 3), the fifth beam R2 can transmit through the second polarizing beam splitter 820 and the second dichroic mirror 830 to the multi-band filter 400.

On the other hand, when the second beam B2 is controlled by the second liquid crystal modulator 810 to be p-polarized (horizontally polarized), the second beam B2 transmits through the second polarizing beam splitter 820 to the second dichroic mirror 830. Since the transmittances of the second dichroic mirror 830 and second filter 850 are both about 100% in the second wavelength (referring to FIG. 3 and FIG. 4B), the second beam B2 can transmit through the second dichroic mirror 830 and the second filter 850 to the sixth photoluminescence element 620. The sixth photoluminescence element 620 receives the second beam B2 and outputs the sixth beam G2 by reflection. Since the transmittance of the second filter 850 is about 100% in the sixth wavelength (referring to FIG. 4B), and the transmittance of the second dichroic mirror 830 is about 0% in the sixth wavelength, after the reflection of the sixth photoluminescence element 620, the sixth beam G2 can transmit through the second filter 850 and be reflected by the second dichroic mirror 830 to the multi-band filter 400.

In another case, when the first beam B1 enters the second optical module 800, the first beam B1 is controlled not to enter the second photoluminescence module 600. The first beam B1 is controlled to be p-polarized (horizontally polarized) to pass through the second polarizing beam splitter 820. Since the transmittance of the second dichroic mirror 830 is about 100% in the first wavelength (referring to FIG. 3), and the transmittance of the second filter 850 the is about 0% in the first wavelength (referring to FIG. 4B), the first beam B1 transmit through the second dichotic mirror 830 to the second filter 850, and then is reflected by the second filter 850 to transmit through the second dichotic mirror 830 again. In this path, the reflected first beam B1 passes through the quarter-wave plate 840 twice, and therefore the original p-polarization state (horizontal polarization state) of the first beam B1 is changed to s-polarization state (vertical polarization state). As a result, the reflected first beam B1 can be reflected at the second polarizing beam splitter 820 to the multi-band filter 400.

Figure 5:
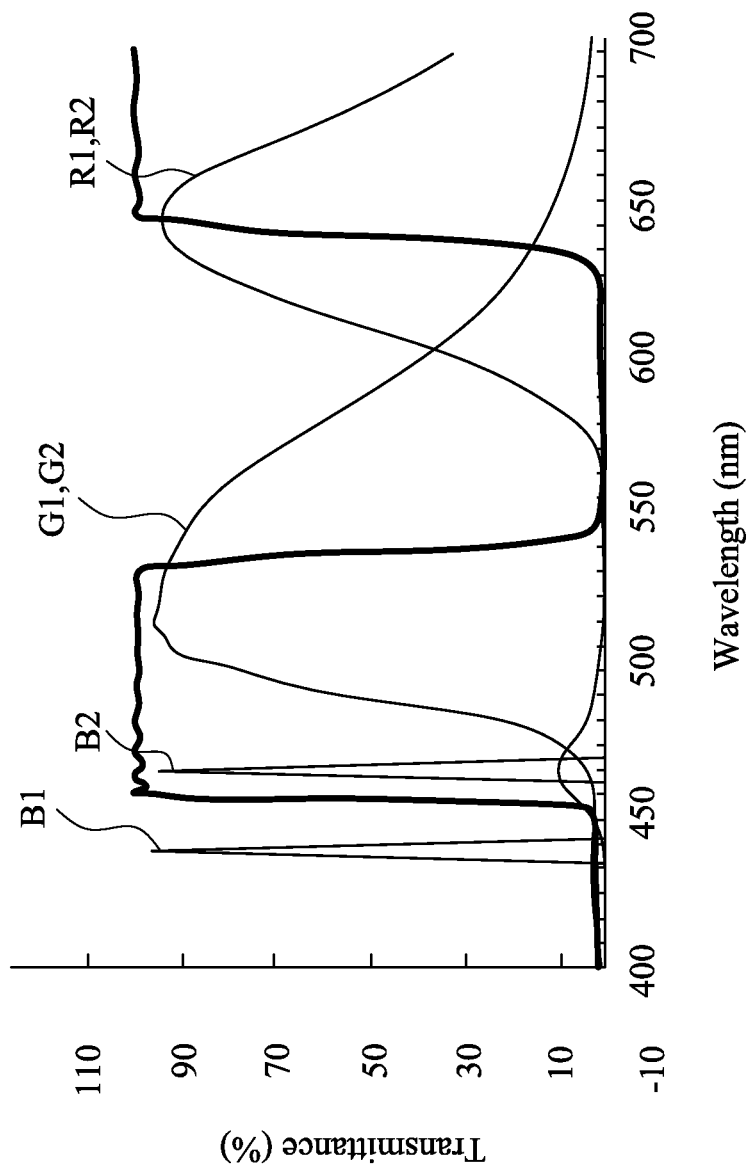
FIG. 5 is a transmittance spectrum of a multi-band filter shown in FIG. 1.

Therefore, the multi-band filter 400 receives the second beam B2, the third beam R1, the fourth beam G1 from the first optical module 700, the first beam B1, the fifth beam R2, and the sixth beam G2 from the optical module 800. FIG. 5 is a transmittance spectrum of the multi-band filter 400 shown in FIG. 1. The light with the wavelength range of 450-550 nanometers and over 640 nanometers transmits through the multi-band filter 400 (the transmittance is about 100%), and the light with the wavelength range of 550-640 nanometers and below 450 nanometers is reflected by the multi-band filter 400 (the transmittance is about 0%). The wavelength range of transmission of the multi-band filter 400 includes the second wavelength, a part of the third wavelength and the fifth wavelength, a part of the fourth wavelength and the sixth wavelength. The wavelength range of reflection of the multi-band filter 400 includes the first wavelength, another part of the third wavelength and the fifth wavelength, another part of the fourth wavelength and the sixth wavelength.

In this embodiment, the wavelength ranges of the third wavelength and the fifth wavelength are the same. The wavelength ranges of the fourth wavelength and the sixth wavelength are the same. The multi-band filter 400 is used for letting the second beam B2, a part of the third beam R1, and a part of the fourth beam G1 pass through itself and reflecting the first beam B1, another part of the third beam R1, and another part of the fourth beam G1. As a result, the beams can be output to the preserved position P by the reflection or transmission of the multi-band filter 400.

In practice, the wavelength ranges of the third wavelength and the fifth wavelength can be the different, and the wavelength ranges of the fourth wavelength and the sixth wavelength can be the different, either. Correspondingly, in this situation, the configuration of the multi-band filter 400 should be changed. The multi-band filter 400 should allow the second beam B2, the third beam R1, and the fourth beam G1 to pass through itself and reflect the first beam B1, the fifth beam R2, and the sixth beam G2 to the preserved position P.

In one or more embodiments, the solid state illuminator includes a light source controller 910 and a liquid crystal controller 920. The light source controller 910 is used for switching the first light source 100 and the second light source 200. The liquid crystal controller 920 is used for switching the liquid crystal optical modulators 310a, 310b, the first liquid crystal modulator 710, and the second liquid crystal modulator 810. The light source controller 910 and the liquid crystal controller 920 can cooperate sequentially for producing the light with different wavelength ranges at different timings.

FIG. 6A to FIG. 6F are optical path schematic diagrams for the solid state illuminator according to an embodiment of the present invention. Another aspect of the present invention provides an operating method of the solid state illuminator. The operating method includes providing a solid state illuminator shown in FIG. 1, turning on the first light source 100 or the second light source 200 sequentially, controlling the path choosing module 300 sequentially, and controlling the first optical module 700 and the second optical module 800 sequentially. As a result, the first beam B1 provided by the first light source 100 or the second beam B2 provided by the second light source 200 is output to the path choosing module 300, for choosing the direction of the first beam B1 or the second beam B2. The first beam B1 or the second beam B2 optionally enters the first optical module 700 or the second optical module 800, the direction of the first beam B1 or the second beam B2 is chosen again at the first optical module 700 or the second optical module 800, and then the beam is output to the preserved position P through the multi-band filter 400.

The following are illustration of a operating method of the solid state illuminator for sequentially outputting the first beam B1, the second beam B2, the third beam R1, the fourth beam G1, the fifth beam R2, and the sixth beam G2.

For clearly illustration, in the following figures, the blocks are filled with slashes to indicate that the elements are at off state, such as the second liquid crystal modulator 810 and the second light source 200 of FIG. 6A. The blank blocks indicates that the elements are at on state, such as the first light source 100 and the liquid crystal optical modulator 310a of FIG. 6A. The on or off state of other elements that beams do not pass through has little influence on the result. For example, in FIG. 6A, the first beam B1 does not pass through the liquid crystal optical modulator 310b or the first liquid crystal modulator 710, and therefore the on or off state of the liquid crystal optical modulator 310b or the first liquid crystal modulator 710 is not limited.

Figure 6A:
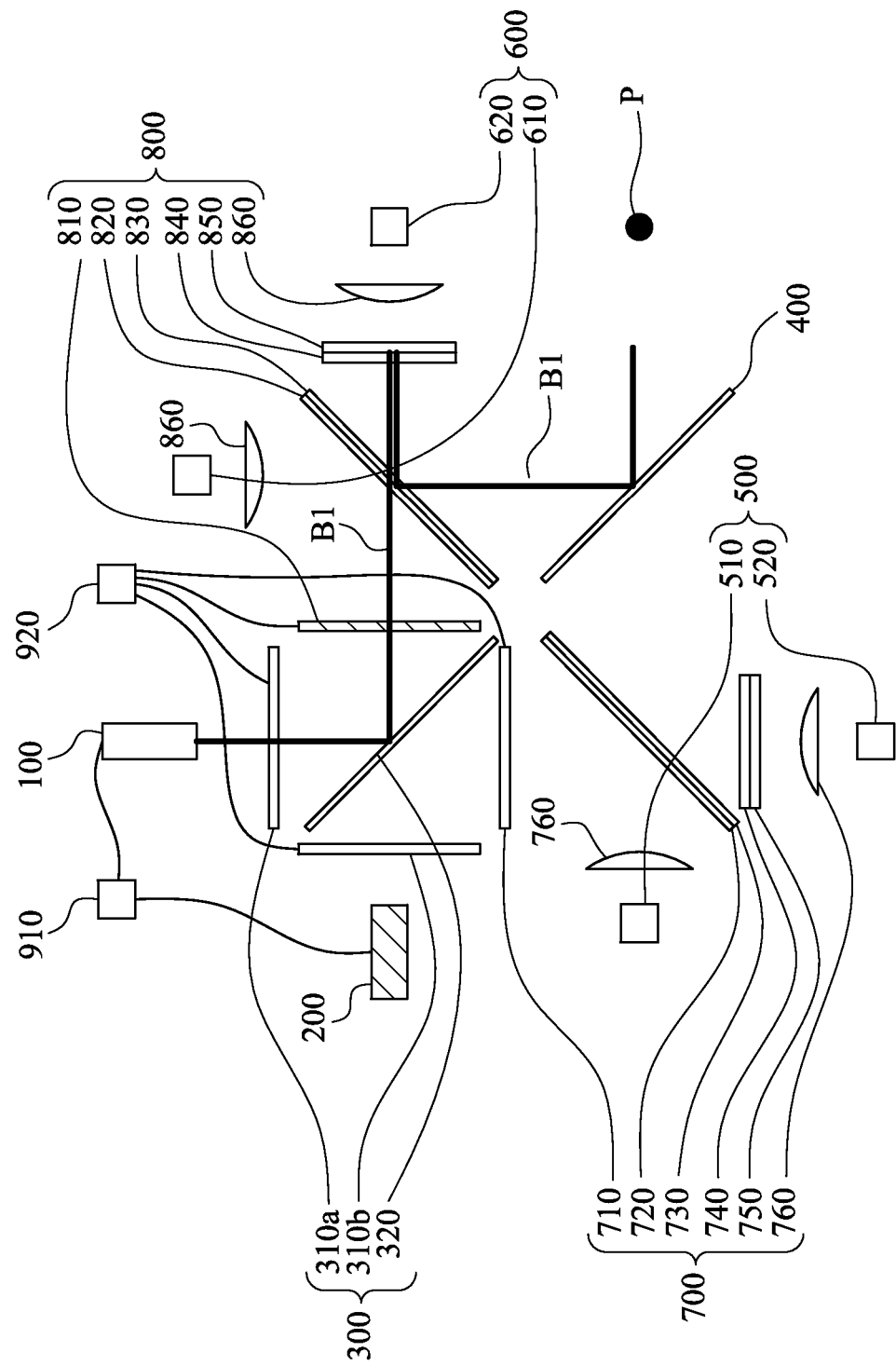
FIG. 6A to FIG. 6F are optical path schematic diagrams for the solid state illuminator according to an embodiment of the present invention.

Referring FIG. 6A, in one or more embodiments, the operating method of the solid state illuminator includes turning on the first light source 100, turning off the second light source 200, turning on the liquid crystal optical modulator 310a, and turning off the second liquid crystal modulator 810 of the second optical module 800 at a first timing T1. As a result, the first beam B1 passing through the second optical module 800 does not enter the second photoluminescence module 600 and is reflected, and the solid state illuminator outputs the first beam B1.

In this embodiment, after the first beam B1 passing through the on-state liquid crystal optical modulator 310a, the s-polarization state (vertical polarization state) of the first beam B1 keeps unchanged. Then, the first beam B1 is reflected by the polarizing beam splitter 320 to the second optical module 800. After the first beam B1 passing through the off-state second liquid crystal modulator 810, the polarization state of the first beam B1 is changed to be p-polarization state. Therefore, the first beam B1 passes through the second polarizing beam splitter 820 to the second dichroic mirror 830, the quarter-wave plate 840, and the second filter 850.

As the previous description of the second dichroic mirror 830 of FIG. 3 and the second filter 850 of FIG. 4B, after the first beam B1 passes through the second dichroic mirror 830 and the quarter-wave plate 840, the first beam B1 is reflected by the second filter 850, and therefore passes through the quarter-wave plate 840 again. Herein, the polarization state of the first beam B1 is changed from p-polarization state to s-polarization state since the first beam B1 passes through the quarter-wave plate 840 twice. As a result, when the first beam B1 passes through the second dichroic mirror 830 to the second polarizing beam splitter 820, the first beam B1 is reflected by the second polarizing beam splitter 820 to the multi-band filter 400, as the multi-band filter of FIG. 5, and the first beam B1 is reflected to the preserved position P.

Figure 6B:
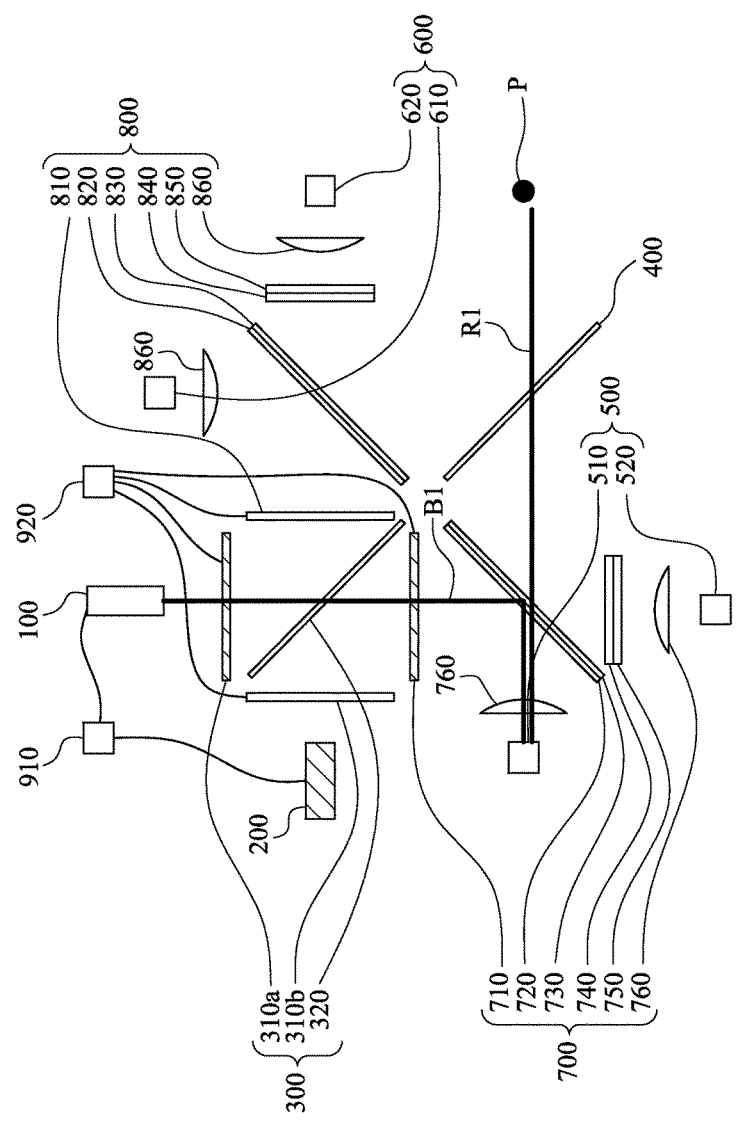

Referring to FIG. 6B, the operating method of the solid state illuminator includes turning on the first light source 100, turning off the second light source 200, turning off the liquid crystal optical modulator 310a, and turning off the first liquid crystal modulator 710 of the first optical module 700 at a second timing T2. As a result, the first beam B1 enters the third photoluminescence element 510 to output a third beam R1 with a third wavelength.

In this embodiment, after the first beam B1 passing through the off-state liquid crystal optical modulator 310a, the first beam B1 is changed form s-polarization state (vertical polarization state) to p-polarization state (horizontal polarization state). Then, the first beam B1 passes through the polarizing beam splitter 320 to the first optical module 700. After passing through the off-state first liquid crystal modulator 710, the first beam B1 is changed form p-polarization state to s-polarization state. Therefore, the first beam B1 is reflected by the first polarizing beam splitter 720 to the third photoluminescence element 510 and transformed to the third beam R1.

After that, the third beam R1 is guided to the first polarizing beam splitter 720 through the collective lens 760 and other elements. As shown in FIG. 2, the transmittance of the first polarizing beam splitter 720 is different according to different polarization states only in the wavelength range of the first wavelength and the second wavelength. The properties of the first dichroic mirror 730 is shown in FIG. 3. As a result, the third beam R1 passes through the first polarizing beam splitter 720 and the first dichroic mirror 730 to the multi-band filter 400, as the multi-band filter 400 in FIG. 5. The third beam R1 passes through the multi-band filter 400 to arrive at the preserve position P.

Figure 6C:
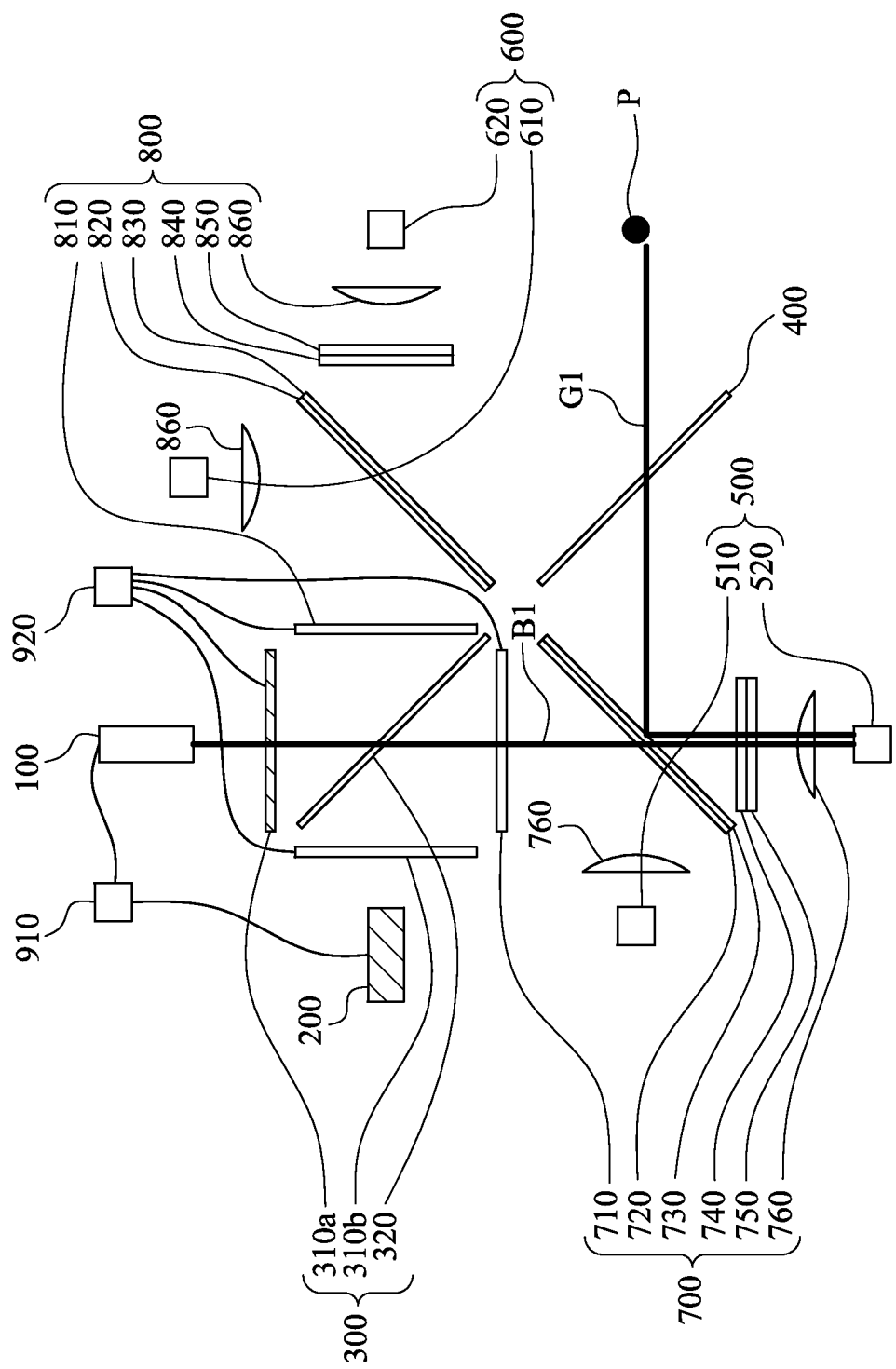

Referring to FIG. 6C, in one or more embodiments, the operating method of the solid state illuminator includes turning on the first light source 100, turning off the second light source 200, turning off the liquid crystal optical modulator 310a, and turning on the first liquid crystal modulator 710 at a third timing T3. As a result, the first beam B1 enters a fourth photoluminescence element 520 of the first photoluminescence module 500 to output a fourth beam G1 with a fourth wavelength, in which the peaks of the first wavelength, the third wavelength, the fourth wavelength are not overlapped.

In this embodiment, after the first beam B1 passing through the off-state liquid crystal optical modulator 310a, the first beam B1 is changed form s-polarization state (vertical polarization state) to p-polarization state (horizontal polarization state). Then, the first beam B1 passes through the polarizing beam splitter 320 to the first optical module 700. After passing through the on-state first liquid crystal modulator 710, the polarization state of the first beam B1 keeps unchanged. Therefore, the first beam B1 passes through the first polarizing beam splitter 720, the first dichroic mirror 730 (as FIG. 3 shown), the quarter-wave plate 740, and the first filter 750 (as FIG. 4A shown) and enters the fourth photoluminescence element 520 of the first photoluminescence module 500 and is transformed into the fourth beam G1.

After that, the fourth beam G1 is guided to the first dichroic mirror 730 (as FIG. 3 shown) through the collective lens 760 and other elements, in which the fourth beam G1 passes through the first filter (as FIG. 4A shown) and the quarter-wave plate, and is reflected at the first dichroic mirror 730 (as FIG. 3 shown) to the multi-band filter 400 (as FIG. 5 shown). The fourth beam G1 passes through the multi-band filter 400 to arrive at the preserve position P.

Figure 6D:
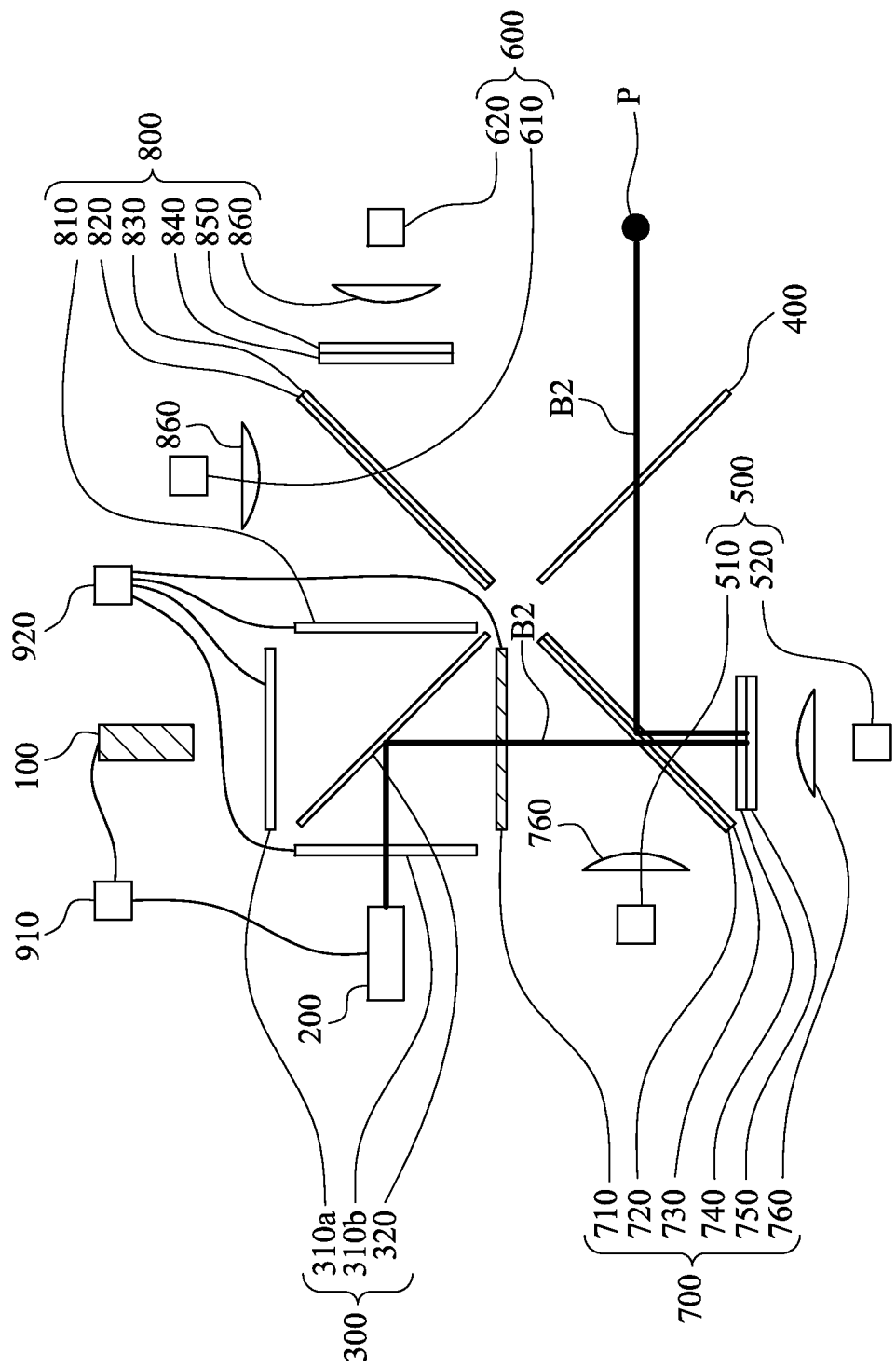

Referring to FIG. 6D, the operating method includes turning on the second light source 200, turning off the first light source 100, turning on the other liquid crystal optical modulator 310b of the path choosing module 300, and turning off the first liquid crystal modulator 710 at a fourth timing T4. As a result, the second beam B2 passing through the first optical module 700 does not enter the first photoluminescence module 500 and is reflected. The solid state illuminator outputs the second beam B2.

In this embodiment, after the second beam B2 passing through the on-state liquid crystal optical modulator 310b, the s-polarization state (vertical polarization state) of the second beam B2 keeps unchanged. Then, the second beam B2 is reflected by the polarizing beam splitter 320 to the first optical module 700. After the second beam B2 passing through the off-state first liquid crystal modulator 710, the polarization state of the second beam B2 is changed to be p-polarization state. Therefore, the second beam B2 passes through the first polarizing beam splitter 720 to the first dichroic mirror 730, the quarter-wave plate 740, and the first filter 750.

As the previous description of the first dichroic mirror 730 of FIG. 3 and the first filter 750 of FIG. 4A, after the second beam B2 passes the first dichroic mirror 730 and the quarter-wave plate 740, the second beam B2 is reflected by the first filter 750, and therefore passes through the quarter-wave plate 740 again. Herein, the polarization state of the second beam B2 is changed from p-polarization state to s-polarization state since the second beam B2 passes through the quarter-wave plate 740 twice. As a result, when the second beam B2 passes through the first dichroic mirror 730 to the first polarizing beam splitter 720, the second beam B2 is reflected by the first polarizing beam splitter 720 to the multi-band filter 400, as the multi-band filter 400 of FIG. 5, and the second beam B2 is reflected to the preserved position P.

Figure 6E:
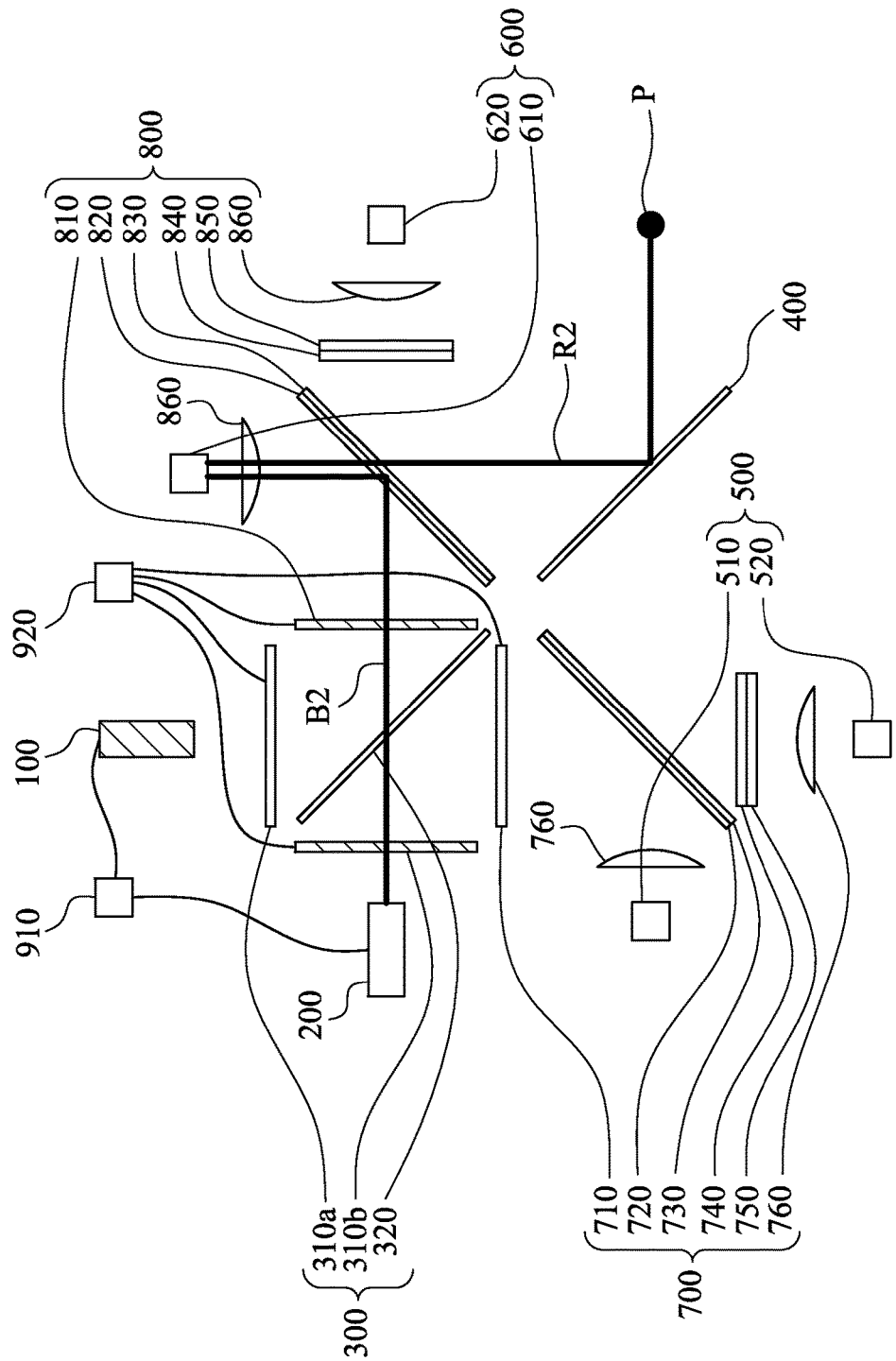

Referring to FIG. 6E, the operating method of the solid state illuminator includes turning on the second light source 200, turning off the first light source 100, turning off the liquid crystal optical modulator 310b, and turning off the second liquid crystal modulator 810 at a fifth timing T5. As a result, the second beam B2 enters the fifth photoluminescence element 610 of the second photoluminescence module 600 to output a fifth beam R2 with a fifth wavelength.

In this embodiment, after the second beam B2 passing through the off-state liquid crystal optical modulator 310b, the second beam B2 is changed form s-polarization state (vertical polarization state) to p-polarization state (horizontal polarization state). Then, the second beam B2 passes through the polarizing beam splitter 320 to the second optical module 800. After passing through the off-state second liquid crystal modulator 810, the second beam B2 is changed form p-polarization state to s-polarization state. Therefore, the second beam B2 is reflected by the second polarizing beam splitter 820 to the fifth photoluminescence element 610 and transformed into the fifth beam R2.

After that, the fifth beam R2 is guided to the second polarizing beam splitter 820 through the collective lens 860 and other elements. As shown in FIG. 2, the transmittance of the second polarizing beam splitter 820 is different according to different polarization states only in the wavelength range of the first wavelength and the second wavelength. The properties of the second dichroic mirror 830 are shown in FIG. 3. As a result, the fifth beam R2 passes through the second polarizing beam splitter 820 and the second dichroic mirror 830 to the multi-band filter 400, as the multi-band filter in FIG. 5. The fifth beam R2 passes through the multi-band filter 400 to arrive at the preserve position P.

Figure 6F:
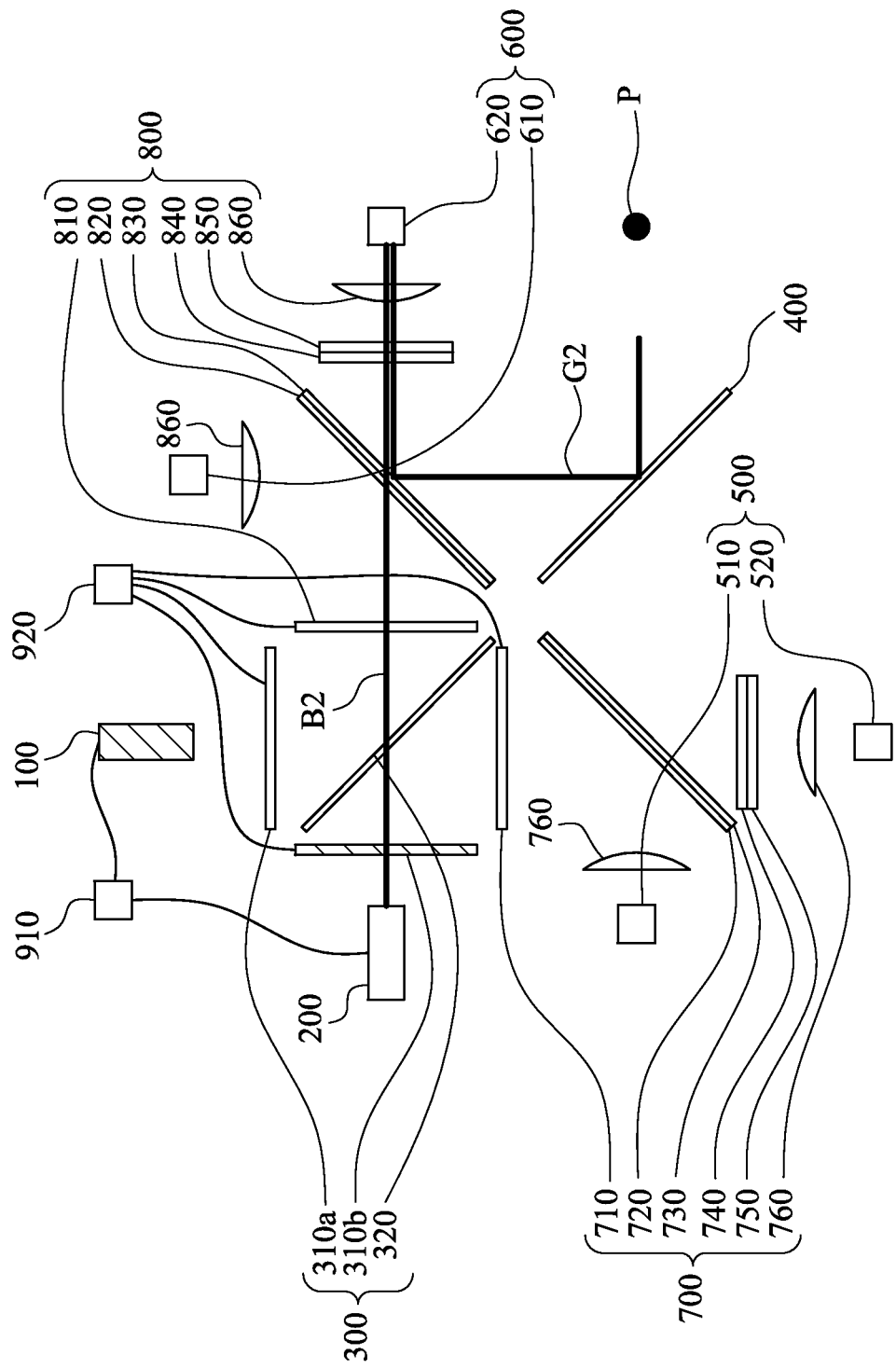

Referring to FIG. 6F, in one or more embodiments, the operating method of the solid state illuminator includes turning on the second light source 200, turning off the first light source 100, turning off the liquid crystal optical modulator 310b, and turning on the second liquid crystal modulator 810 at a sixth timing T6. As a result, the second beam B2 enters the sixth photoluminescence element 620 of the second photoluminescence module 600 to output the sixth beam G2 with the sixth wavelength, in which the peaks of the second wavelength, the fifth wavelength, the sixth wavelength are not overlapped.

In this embodiment, after passing through the off-state liquid crystal optical modulator 310b, the second beam B2 is changed form s-polarization state (vertical polarization state) to p-polarization state (horizontal polarization state). Then, the second beam B2 passes through the polarizing beam splitter 320 to the second optical module 800. After passing through the on-state second liquid crystal modulator 810, the polarization state of the second beam B2 keeps unchanged. Therefore, the second beam B2 passes through the second polarizing beam splitter 820, the second dichroic mirror 830 (as FIG. 3 shown), the quarter-wave plate 840, and the second filter 850 (as FIG. 4B shown) and enters the sixth photoluminescence element 620 of the second photoluminescence module 600. The second beam B2 is transformed into the sixth beam G2.

After that, the sixth beam G2 is guided to the second dichroic mirror 830 through the collective lens 860 and other elements, in which the sixth beam G2 passes through the second filter 850 and the quarter-wave plate 840 again, and is reflected at the second dichroic mirror 830 to the multi-band filter 400 (as FIG. 5 shown). The sixth beam G2 passes through the multi-band filter 400 to arrive at the preserve position P.

Figure 7:
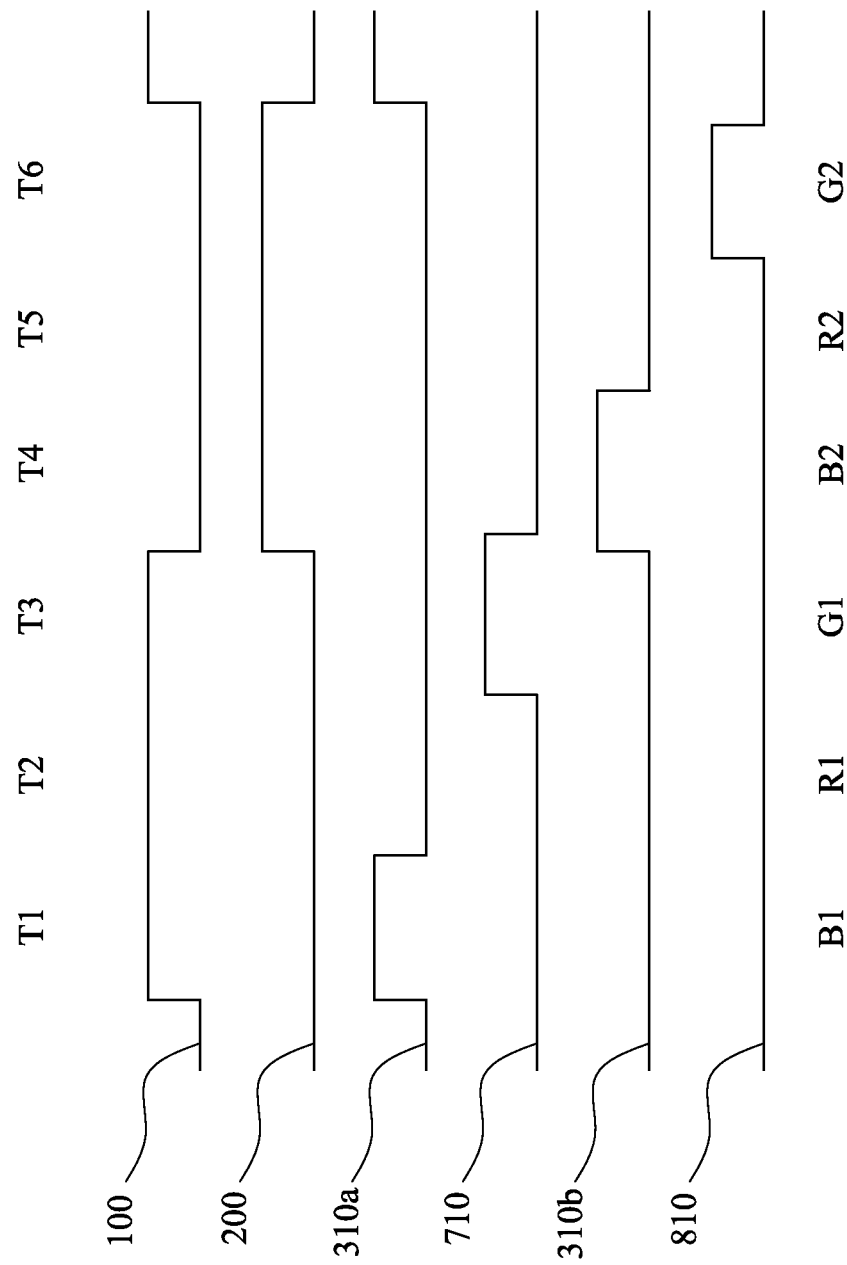
FIG. 7 is a schematic diagram for an operating method of the solid state illuminator shown in FIG. 6A to FIG. 6F.

FIG. 7 is a schematic diagram for an operating method of the solid state illuminator shown in FIG. 6A to FIG. 6F. The operating method and output results from the first timing to the sixth timing of FIG. 6A to FIG. 6F are summarized in FIG. 7. By properly operating the liquid crystal optical modulators 310*a*, 310*b*, the first liquid crystal modulator 710, the second liquid crystal modulator 810, and the switches of the first light source 100 and the second light source 200, users can sequentially gain the first beam B1, the second beam B2, the third beam R1, the fourth beam G1, the fifth beam R2, and the sixth beam G2 at the preserved position.

The invention provides a solid state illuminator for a stereoscopic display. By the configuration of light sources, photoluminescence elements, filters, and exploiting liquid crystal element to control paths of beams, the solid state illuminator can optionally provide a red, green, or blue beam, and can provides two different sets of red, green, and blue beams sequentially. This invention can be applied to the technology of stereoscopic display, by two sets of the red, green, and blue beams to distinguish the left-eye image or the right-eye image.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A solid state illuminator, comprising:
a first light source for providing a first beam with a first wavelength;
a second light source for providing a second beam with a second wavelength, wherein ranges of the first wavelength and the second wavelength are not overlapped;
a path choosing module for controlling a plurality of directions of the first beam and the second beam;
a multi-band filter, wherein the second beam transmits through the multi-band filter, and the first beam is reflected by the multi-band filter;
a first photoluminescence module for providing a third beam or a fourth beam;
a second photoluminescence module for providing a fifth beam or a sixth beam;
a first optical module for receiving the first beam or the second beam from the path choosing module, the first optical module enabling the first beam to enter the first photoluminescence module and to be transformed into the third beam or the fourth beam, and guiding the second beam, the third beam, or the fourth beam to pass through the multi-band filter to arrive at a predetermined position; and
a second optical module for receiving the first beam or the second beam from the path choosing module, the second optical module enabling the second beam to enter the second photoluminescence module and to be transformed into the fifth beam or the sixth beam, and guiding the first beam, the fifth beam, or the sixth beam to be reflected by the multi-band filter to arrive at the predetermined position.

2. The solid state illuminator of claim 1, wherein the path choosing module comprises two liquid crystal optical modulators and a polarizing beam splitter, wherein the liquid crystal optical modulators are disposed corresponding to the first light source and the second light source respectively, and the polarizing beam splitter is disposed on a plurality of paths of the first beam and the second beam, so that the first beam and the second beam pass through the liquid crystal optical modulators respectively and then both enter the polarizing beam splitter, and the directions of the first beam and the second beam are chosen at the polarizing beam splitter.

3. The solid state illuminator of claim 2, wherein the first photoluminescence module comprises a third photoluminescence element and a fourth photoluminescence element, wherein the first beam optionally enters the third photoluminescence element or the fourth photoluminescence element and is transformed into the third beam with a third wavelength or the fourth beam with a fourth wavelength, the second photoluminescence module comprises a fifth photoluminescence element and a sixth photoluminescence element, and the second beam optionally enters the fifth photoluminescence element or the sixth photoluminescence element and is transformed into the fifth beam with a fifth wavelength or the sixth beam with a sixth wavelength.

4. The solid state illuminator of claim 3, wherein the first optical module is disposed on one side of the polarizing beam splitter opposed to the first light source, and the first optical module comprises a first liquid crystal modulator and a first polarizing beam splitter; and the second optical module is disposed on one side of the polarizing beam splitter opposed to the second light source, and the second optical module comprises a second liquid crystal modulator and a second polarizing beam splitter.

5. The solid state illuminator of claim 4, wherein the first optical module comprises a first dichroic mirror, disposed on one side of the first polarizing beam splitter adjacent to the fourth photoluminescence element for reflecting the fourth beam to the multi-band filter and letting the third beam pass through the first dichroic mirror to enter the multi-band filter, and the second optical module comprises a second dichroic mirror, disposed on one side of the second polarizing beam splitter adjacent to the sixth photoluminescence element for reflecting the sixth beam to the multi-band filter and letting the fifth beam pass through the second dichroic mirror to enter the multi-band filter.

6. The solid state illuminator of claim 5, wherein the first beam and the third beam transmit through the first dichroic mirror, the fourth beam is reflected by the first dichroic mirror, the second beam and the fifth beam transmit through the second dichroic mirror, and the sixth beam is reflected by the second dichroic mirror.

7. The solid state illuminator of claim 5, wherein the first optical module comprises a first filter and a quarter-wave plate, both disposed corresponding to the fourth photoluminescence element and for reflecting the second beam to the first dichroic mirror, and the second optical module comprises a second filter and another quarter-wave plate, both disposed corresponding to the sixth photoluminescence element and for reflecting the first beam to the second dichroic mirror.

8. The solid state illuminator of claim 7, wherein the first filter reflects the second beam, the first beam, the third beam, and the fourth beam transmit through the first filter, the second filter reflects the first beam, and the second beam, the fifth beam, and the sixth beam transmit through the second filter.

9. The solid state illuminator of claim 4, wherein the third wavelength and the fifth wavelength have the same spectrum, and the fourth wavelength and the sixth wavelength have the same spectrum; and the second beam, a part of the third beam, and a part of the fourth beam transmit through the multi-band filter, and the first beam, the another part of the third beam, and another part of the fourth beam are reflected by the multi-band filter.

10. The solid state illuminator of claim 4, wherein the second beam, the third beam, and the fourth beam transmit through the multi-band filter, and the first beam, the fifth beam, and the sixth beam are reflected by the multi-band filter.

11. The solid state illuminator of claim 4, wherein the transmittances of the first polarizing beam splitter and the second polarizing beam splitter of the light of different polarization states are different in the ranges of the first wavelength and the second wavelength, and are the same in the ranges of the third wavelength, the fourth wavelength, the fifth wavelength, and the sixth wavelength.

12. The solid state illuminator of claim 4, wherein the peaks of the third wavelength and the fifth wavelength are in the range of 610 nanometers to 670 nanometers, and the peaks of the fourth wavelength and the sixth wavelength are in the range of 510 nanometers to 580 nanometers.

13. The solid state illuminator of claim 4, wherein the first optical module and the second optical module individually comprise at least one collective lens, and the collective lenses are disposed between the first polarizing beam splitter and the third photoluminescence element or the fourth photoluminescence element, and between the second polarizing beam splitter and the fifth photoluminescence element or the sixth photoluminescence element.

14. The solid state illuminator of claim 4, further comprising a light source controller for switching the first beam and the second beam.

15. The solid state illuminator of claim 4, further comprising a liquid crystal controller for switching the liquid crystal optical modulators, the first liquid crystal modulator, and the second liquid crystal modulator.

16. The solid state illuminator of claim 1, wherein the first beam and the second beam are blue rays, the peak of the first wavelength is in the range of 435 nanometers to 450 nanometers, and the peak of the second wavelength is in the range of 455 nanometers to 470 nanometers.

17. An operating method of a solid state illuminator, comprising:
providing a solid state illuminator of claim 1;
turning on the first light source and the second light source sequentially;
controlling the path choosing module sequentially to choose the directions of the first beam or the second beam, so that the first beam or the second beam enters the first optical module or the second optical module; and
controlling the first optical module and the second optical module sequentially to choose the directions of the first beam or the second beam, so that the first beam passing through the first optical module enters the first photoluminescence module, and that the second beam passing through the second optical module enters the second photoluminescence module.

18. The operating method of the solid state illuminator of claim 17, wherein the path choosing module comprises two liquid crystal optical modulators and a polarizing beam splitter, wherein the liquid crystal optical modulators are disposed corresponding to the first light source and the second light source respectively, and the polarizing beam splitter is disposed on a plurality of paths of the first beam and the second beam, so that the first beam and the second beam pass through the liquid crystal optical modulators respectively and then both enter the polarizing beam splitter, and the directions of the first beam and the second beam are chosen at the polarizing beam splitter, the operating method further comprising:
directing the first beam passing through the second optical module not to enter the second photoluminescence module so as to output the first beam at a first timing when the first light source is turned on, the second light source is turned off, the liquid crystal optical modulator of the path choosing module corresponding to the first light source is turned on, and a second liquid crystal modulator of the second optical module is turned off; and
directing the first beam to enter a third photoluminescence element of the first photoluminescence module so as to output the third beam with a third wavelength at a second timing when the first light source is turned on, the second light source is turned off, the liquid crystal optical modulator of the path choosing module corresponding to the first light source is turned off, and a first liquid crystal modulator of the first optical module is turned off.

19. The operating method of the solid state illuminator of claim 18, further comprising:
directing the first beam to enter a fourth photoluminescence element of the first photoluminescence module so as to output the fourth beam with a fourth wavelength at a third timing when the first light source is turned on, the second light source is turned off, the liquid crystal optical modulator of the path choosing module corresponding to the first light source is turned off, and the first liquid crystal modulator is turned on, wherein the peaks of the first wavelength, the third wavelength, the fourth wavelength are not overlapped; and
directing the second beam passing through the first optical module not to enter the first photoluminescence module so as to output the second beam at a fourth timing when the second light source is turned on, the first light source is turned off, the liquid crystal optical modulator of the path choosing module corresponding to the second light source is turned on, and the first liquid crystal modulator is turned off.

20. The operating method of the solid state illuminator of claim 19, further comprising:
   directing the second beam to enter a fifth photoluminescence element of the second photoluminescence module so as to output the fifth beam with a fifth wavelength at a fifth timing when the second light source is turned on, the first light source is turned off, the liquid crystal optical modulator of the path choosing module corresponding to the second light source is turned off, and the second liquid crystal modulator is turned off; and
   directing the second beam to enter a sixth photoluminescence element of the second photoluminescence module so as to output the sixth beam with a sixth wavelength at a sixth timing when the second light source is turned on, the first light source is turned off, the liquid crystal optical modulator of the path choosing module corresponding to the second light source is turned off, and the second liquid crystal modulator is turned on, wherein the peaks of the second wavelength, the fifth wavelength, the sixth wavelength are not overlapped.

* * * * *